United States Patent [19]

Pfisterer

[11] 4,224,265
[45] Sep. 23, 1980

[54] TANK, PARTICULARLY OIL TANK

[76] Inventor: Hans-Peter Pfisterer, Beihingerstr.146, Benningen, Fed. Rep. of Germany, D-7141

[21] Appl. No.: 862,682

[22] Filed: Dec. 21, 1977

[30] Foreign Application Priority Data

Dec. 24, 1976 [DE] Fed. Rep. of Germany ....... 2658971

[51] Int. Cl.$^2$ ............................................... B28B 1/16
[52] U.S. Cl. ...................... 264/71; 264/256; 264/309; 264/314
[58] Field of Search ............... 264/256, 32, 309, 314, 264/71; 52/135

[56] References Cited

U.S. PATENT DOCUMENTS

| 2,010,232 | 8/1935 | Herbest | 109/83 X |
| 3,223,759 | 12/1965 | Williamson | 264/34 |
| 3,439,461 | 4/1969 | Chandler | 264/256 |
| 3,619,457 | 11/1971 | Chandler | 264/256 |
| 3,643,910 | 2/1972 | Heifetz | 264/32 X |
| 3,668,287 | 6/1972 | Mackie | 264/32 X |
| 4,060,581 | 11/1977 | Darby | 52/135 X |

Primary Examiner—Thomas P. Pavelko
Attorney, Agent, or Firm—McGlew and Tuttle

[57] ABSTRACT

A hollow tank is formed by placing a hollow glass fiber reinforced inner container within a hollow rigid form comprising pieces assembled around the inner container and spaced from it to leave an air gap between the inner container and the inner wall of the assembled form. A suitable concrete material is introduced into the space between the inner container and the assembled form and is allowed to cure as a jacket of concrete integrally attached to and enclosing the inner container. The inner container may be formed by coating an inflated balloon with a thin layer of polyester resin and thereafter spraying on the glass fiber reinforced material to a thickness of a few mm. The concrete may be a standard flowable concrete or a polyester concrete, which is a resin-bonded gravel mixture. The concrete may be the outer layer formed as a jacket around the glass fiber reinforced inner container, or another glass fiber reinforced layer may be formed on the outer surface of the concrete. The buoyant upward force of regular concrete in fluid form is sufficiently cancelled by first introducing a certain quantity of water into the inner container. Thereafter the fluid concrete is introduced into the space between the inner container and the surrounding form to exert a buoyant force at least substantially overcoming the downward force of the water. Thereafter the inner container is filled with water and the remainder of the space between the inner container and the surrounding form is filled with the fluid concrete, which is allowed to set and thereafter is removed from the form.

5 Claims, 8 Drawing Figures

TANK, PARTICULARLY OIL TANK

BACKGROUND OF THE INVENTION

1. Field of the Invention

The invention relates to a tank, particularly for storing fuel or diesel oil, comprising an inner container which is made in one piece of a glass fiber reinforced plastic.

2. The Prior Art

Such a tank is already known per se. It is manufactured by applying a fiber glass reinforced laminate in a fiber spraying operation to an inflatable balloon the shape of which corresponds to the tank cavity. In advance, a thin layer of a pure polyester resin having a thickness of about 0.3 to 0.5 mm at most is applied to the balloon. The glass fiber reinforced material is sprayed on only after this thin layer is somewhat cured. If provided, a manhole ring may be fitted over the empty balloon which is supported for rotation on a horizontal arm extending therein, and the manhole ring may be fixed by means of a supporting ring. Upon applying the glass fiber reinforced layer or layers and rolling them up and out, a cover layer is applied in addition. As soon as all is cured, the air is allowed to escape from the balloon and the finished glass fiber reinforced body is removed in the direction of the free end of the supporting arm.

In this tank of the prior art, a second container is applied to the glass fiber reinforced inner container formed in the described manner, with the interposition of a porous layer which, in a known manner, serves the purpose of monitoring leakage by means of a vacuum checking device.

The glass fiber reinforced material is relatively expensive. This leads to relatively high production costs of such a double-walled glass fiber reinforced glass tank. Therefore, the problem underlying the invention is to provide a tank of the above mentioned kind and a method of manufacturing such a tank, making it possible to reduce the production costs relative to those of a double-walled glass fiber reinforced tank.

SUMMARY OF THE INVENTION

To solve this problem, a tank is provided, particularly for storing fuel or diesel oil, which comprises a glass fiber reinforced inner container made in a single piece and is characterized, in accordance with the invention, by a jacket made integrally of concrete or a resin-bonded gravel mixture (polyester concrete). In another solution of the posed problem, a tank, particularly for storing fuel or diesel oil, and comprising a glass fiber reinforced inner container made in one piece and surrounded, with the interposition of an intermediate layer permeable to air, by a second glass fiber reinforced container, is provided, in accordance with the invention, with a jacket made integrally of concrete.

Further, for solving the problem, a method of manufacturing a tank provides, in accordance with the invention, that the glass fiber reinforced inner container or the second glass fiber reinforced container is surrounded with a reinforcement and then placed in an at least two-part concrete form, that after closing the concrete form and aligning the glass fiber reinforced container relative to the concrete form, concrete is introduced into the concrete form and vibrated, and that after the setting of the concrete, the concrete form is opened and the tank is removed. Finally, in another solution in accordance with the invention, a method of manufacturing a tank is characterized in that the glass fiber reinforced inner container is placed into an at least two-part concrete form, that after closing the concrete form and aligning the glass fiber reinforced inner container relative to the concrete form, a resin-bonded gravel mixture is introduced into the concrete form and vibrated, and that after the setting of the resin-bonded gravel mixture, the concrete form is opened and removed, whereupon, in a spray operation, the glass fiber reinforced outer shell is applied to the jacket.

As compared to the glass fiber reinforced material, concrete is substantially less expensive, so that, as desired, the tank can be manufactured according to this invention at lower production costs than a tank of the prior art. Should regulations require a monitoring of the tank, which, in a well-known manner, is done by evacuating a porous layer provided between two layers impermeable to air, with variations in the vacuum permitting to infer therefrom a leak in the inner or outer layer impermeable to air, then it is necessary, since concrete is permeable to air, to use, for example, two glass fiber reinforced containers within each other. The outer one of these two glass fiber reinforced containers is then surrounded, in accordance with one of the inventive solutions, by a supporting integral concrete jacket, wherefore the two glass fiber reinforced containers can be made with very thin walls. That is why, in spite of the additional concrete jacket, such a tank can still be manufactured at lower expenses than the double-walled glass fiber reinforced tank of the prior art, because in this latter one, for statical reasons, both the inner and the outer container must have a three- or fourfold wall thickness.

In cases where the jacket of the inner container is made not of conventional concrete but of a resin-bonded gravel mixture, the jacket may be surrounded, according to a development of the invention, by a glass fiber reinforced outer shell. The resin-bonded intermediate layer of gravel mixture makes it possible to use the vacuum method for monitoring the tank and in addition, gives the tank the necessary statical strength. Consequently, in this design again, the walls of the inner container as well as of the glass fiber reinforced outer shell can be made relatively thin, for example, in a thickness of about 3 mm. Therefore, this tank, as well as the last mentioned one, can be used without difficulties at locations where water protection is necessary.

Preferably, the tank is characterized by a spherical, oval, drop-like or similar shape, with a tubular manhole neck joined thereon. Particular preference is given to the spherical shape, because this shape provides the largest volume with the smallest surface.

According to a further development of the invention, a method of manufacturing a tank provides that the glass fiber reinforced inner container or, if provided, the second glass fiber reinforced container is surrounded with a reinforcement and then placed in an at least two-part concrete form. After closing the concrete form and aligning the glass fiber reinforced container relative to the concrete form, concrete is introduced into the latter and vibrated. Then, after the setting of the concrete, the concrete form is opened and the tank is removed. Thus, this method is the same for single- and double-walled glass fiber reinforced inner containers. It is, of course, the outermost glass fiber reinforced container which is to be aligned relative to the concrete form, i.e. its surface is to be spaced uniformly from the inside surface of the concrete form which, preferably, is made of steel, and the distance is to be at least 50 mm. The reinforcement must be fixed to the external surface of the glass fiber reinforced container or, in a two-shell design, of the second glass fiber reinforced container, in such a manner as to prevent a displacement of the reinforcement upon filling and vibrating the concrete, and also to ensure the correct position of the reinforcement within the concrete wall to be formed.

With the preferred spherical shape of the tank formed according to this invention, the concrete form is advantageously laid out as two hemispheres of which the lower one is fixed and the upper one is removed in each instance for inserting the glass fiber reinforced container and removing the finished tank. Advantageously, lugs or other elements are embedded in the finished tank, facilitating the removal and later also the transportation and installation of the same. Care must be taken, of course, to design the concrete form in a manner such as to permit vibrating and, as far as the form itself is vibrated, to ensure that the form will withstand the occuring loads. Further, appropriate measures must be taken to maintain the correct, in particular concentric, position not only of the reinforcement relative to the glass fiber reinforced container but also of the reinforcement and the container relative to the concrete form.

In accordance with a further development of the invention, it is provided that prior to fixing the reinforcement, grit is spread on the external surface of the glass fiber reinforced container or, if provided, of the second glass fiber reinforced container. This grit ensures a better bond with the jacket to be concreted thereon. It is also advisable to spread the grit over the glass fiber reinforced container before the latter is completely cured. With this precaution, the grit adheres better to the external surface of the glass fiber reinforced container. According to another variant of the invention, it is provided that for placing the reinforcement in position, two reinforcement cage parts are braced on, by means of spacers, and fixed to the glass fiber reinforced inner container or, if provided, to the second glass fiber reinforced container. The shape of the reinforcement cage parts, of course, corresponds to the external contour of the glass fiber reinforced container, i.e. if a spherical shape is provided, the reinforcement cage parts have the shape of hollow hemispheres.

In accordance with a further embodiment of the invention, a method of manufacturing a tank provides that the glass fiber reinforced inner container is placed into an at least two-part concrete form, and after closing the concrete form and aligning the glass fiber reinforced inner container relative to the concrete form, resin-bonded gravel mixture is introduced into the concrete form and vibrated. After the setting of the gravel mixture, the concrete form is opened and removed, whereupon, in a spray operation, the glass fiber reinforced outer shell is applied to the jacket. This operation differs from that used for producing the glass fiber reinforced inner container substantially only in that an internal supporting structure, such as the inflatable balloon there employed, can be omitted. In addition, preferably, the axis of rotation will be provided in the vertical direction and the body to be jacketed will be very advantageously supported on a rotary structure provided on the floor and comparable to a potter's wheel.

As compared to the conventional concrete, the resin-bonded gravel mixture has two essential advantages. First, physically, the mixture behaves like a solid, i.e. differently from concrete. Concrete, prior to setting, acts like a liquid, which results in considerable buoyant forces which must be counteracted in an appropriate manner. Thus, buoyant forces, at least such as are worth mentioning, do not occur in a resin-bonded gravel mixture, wherefrom the problems do not arise with this material, or are hardly present. Second, upon solidification, the resin-bonded gravel mixture is porous, so that the mentioned vacuum monitoring between the outer and inner glass fiber reinforced containers can be applied in the known manner. The vacuum testing space is then formed by the entire gravel-resin layer and the necessary exhaust and measuring lines can be fixed to the glass fiber reinforced surface of the inner container prior to its placing in the concrete form.

For applying the outer glass fiber reinforced layer to the special concrete of resin-bonded gravel mixture, the formed body may also be suspended from a vertical swivel pin, for which purpose the dome of the tank may be used. As far as in this connection an additional support is provided at the lower end, the area of support must be subsequently, after the removal of the tank from the mentioned structure, coated with glass fiber reinforced material in addition.

According to a further development of the invention, prior to applying the glass fiber reinforced outer shell, a manhole ring is slipped on the manhole neck. Advantageously, this ring may also be made of a glass fiber reinforced material.

In accordance with a further development of the invention, it is provided that prior to the placement into the concrete form, a closing cover is secured to the manhole neck of the glass fiber reinforced inner container and/or, if provided, of the second glass fiber reinforced container to be jacketed with conventional concrete, with the closing cover being fixed to the removable upper part of the concrete form by means of a mechanism adjustable in length, and being aligned in vertical direction relative to this upper part. The glass fiber reinforced container, single-walled or double-walled in the described manner, can be manufactured very accurately. The same applies to the concrete form. Then, as soon as the glass fiber reinforced container is suspended within the concrete form and aligned with the vertical, with a rotationally symmetrical design relative to the vertical, the spacing between the wall of the container and the concrete form is ensured automatically. In spite of that, it is very advantageous if, with the concrete form closed, the glass fiber reinforced container or, if provided, the second glass fiber reinforced container is laterally braced and/or aligned by means of spacers to be introduced into the form from the outside, and the spacers are removed again prior to removing the glass fiber reinforced container provided with the concrete jacket. Preferably, the spacers are positioned approximately in the equatorial plane, and, more particularly, six special steel bolts with arresting cams are employed for this purpose. As mentioned, the spacers do not, or at least not only, serve for adjusting the lateral spacing of the glass fiber reinforced container from the concrete form, but they are primarily intended also for securing this spacing during the concreting and vibrating operations. The blind holes of relatively small diameter remaining after the removal of the spacers are subsequently closed with concrete of equal quality.

As already explained, unset concrete behaves as a liquid, i.e. acts, in its liquid phase, on the glass fiber reinforced container with a not inconsiderable buoyant force which, on the one hand, tries to push the inner container within the concrete form upwardly and, on the other hand, may lead to a bulging of the glass fiber reinforced container. To prevent the glass fiber reinforced container from being displaced, bulged, or subjected to undue stresses, another development of the invention provides that the glass fiber reinforced inner container is filled, to about one half, preferably with water and then the concrete form is filled, to about one third, with conventional concrete, which makes the buoyant force of the liquid concrete slightly exceed the weight of the water, that after the partial filling with concrete, the glass fiber reinforced inner container is filled with water up to its rim whereupon the rest of the concrete amount is introduced into the concrete form, and that after reaching a satisfactory strength of the concrete and prior to removing the tank from the concrete form, the water is drained. Considered in the other way, this provision of the invention makes it possible to make the wall of the glass fiber reinforced inner container relatively thin, since, as mentioned, the material of the container is very expensive as compared to concrete. A wall thickness of 3.5 to 4 mm of the container is quite satisfactory.

Water is preferred over other filling materials because it is easy to handle, inoffensive, re-usable, and, above all, incompressible. To be able to fully utilize the last mentioned property, even the last amount of residual air must be removed from the glass fiber reinforced inner container. For this reason, advantageously, a filling and an air-vent pipe are provided on the cover for closing the manhole, which pipes project above the cover, for example, by 20 cm. As soon as water escapes from the air-vent pipe, both pipes are firmly closed. This water filling provides not only the weight component counteracting the buoyant force but, in addition, also a very satisfactory internal support. Thereby, undue deformations and stresses in the glass fiber reinforced inner container can be prevented or at least reduced so far as not to have any detrimental effects.

In the following, the method of manufacturing a tank having a single-shell glass fiber reinforced inner container and a jacket of conventional concrete is explained in more detail with reference to the drawings in which:

FIG. 1 diagrammatically illustrates the device and method for manufacturing the glass fiber reinforced inner container;

Figure 1:
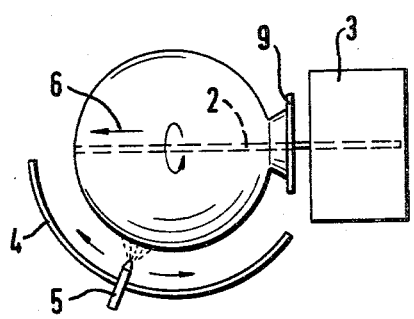
Figure 2:
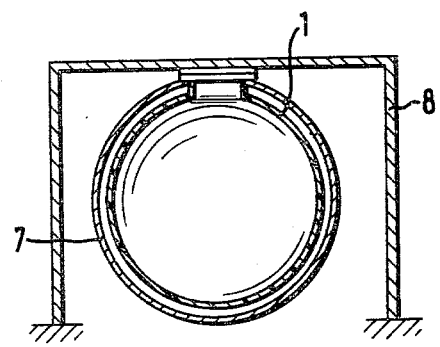
FIGS. 2 to 6 show different operational steps for jacketing the glass fiber reinforced inner container according to FIG. 1, with conventional concrete.
Figure 3:
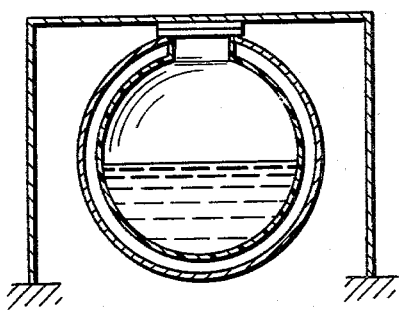

In a known manner, as illustrated in FIG. 1 a glass fiber reinforced inner container 1 is produced by spraying a thin layer, a so-called gelcoat, on an inflatable supporting body which defines the shape of the cavity of the container.

The balloon is rotatable about a horizontal axis 2, the entire driving mechanism being diagrammatically shown at 3. The air in the interior of the balloon is kept at a constant pressure. A manhole ring is engaged on the non-inflated balloon and fixed by means of a supporting ring. Then, the balloon is inflated and the mentioned gelcoat layer is applied. Thereupon, by means of a special apparatus, the glass fiber reinforced laminate is sprayed on in a fiber spray operation. For this purpose, a correspondingly controlled and connected fiber spray gun 5 travels on a guide rail 4 which is shaped in accordance with the contour of the inner container to be produced and, with an inner container of rotationally-symmetrical shape, is associated with the largest diameter, and, with a spherical shape, with the equator. The traveling speed of gun 5 along guide rail 4 is to be chosen so as to deposit the glass fiber reinforced laminate on the entire surface in equal thickness. To this end, the rotational speed about axis 2 may also be varied. Finally, grit material may be spread in addition on the glass fiber reinforced material not yet fully cured. This is provided particularly in the embodiments of FIGS. 2 to 6, and FIG. 7. After curing of the glass fiber reinforced material, the balloon is decompressed and the jointless glass fiber reinforced inner container 1 made in one piece can be removed from axis 2 in the direction of arrow 6.

Subsequently, the glass fiber reinforced inner container 1 is provided with a reinforcement (not shown in FIGS. 2 to 6) and then placed in a concrete form 7. This form comprises two parts (not shown) which are connected to each other, in an appropriate manner, firmly but detachably. The lower part is mounted fixedly, while the upper part is held in place by means of a supporting structure 8. Upon assembling the two parts of the form, first, the glass fiber reinforced inner container is aligned in the vertical direction. For this purpose, a cover is water-tightly secured to the manhole ring 9 of the container, which cover is carried on supporting structure 8 in a manner such as to be displaceable thereon relative to concrete form 7 by means of a rod, particularly a centric one. As soon as the vertical position is adjusted, a potentially centric position of the glass fiber reinforced inner container in concrete form 7 is obtained. To secure or perhaps still correct this position, spacers are introduced into the concrete form from the outside, preferably in the zone of the equatorial plane, i.e. close above and/or below the parting line of the two-part steel casing or concrete form 7.

In the following, the further operational steps are explained while taking as example a 7500-liter tank.

Figure 4:
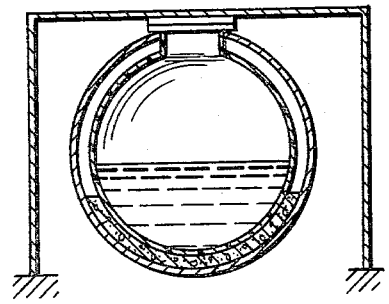
Figure 5:
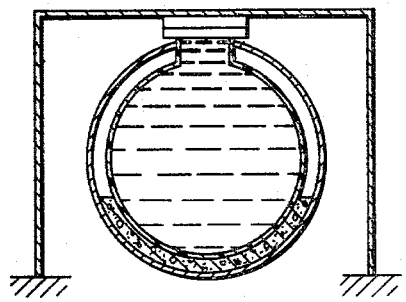
Figure 6:
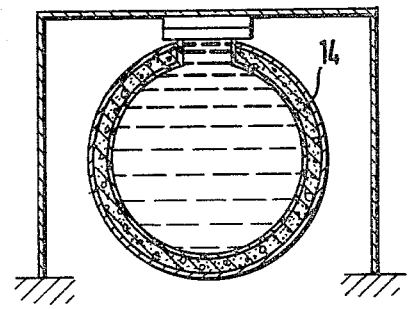

With an already reduced unit volume weight of 2.0 kg/dm$^3$ of the unset concrete, after introducing the whole amount of concrete, the glass fiber reinforced inner container is exposed to a buoyant force of 15,000 kgs. This buoyant force, however, cannot be absorbed by the relatively thin wall, having a thickness of 3.5 to 4 mm, of the glass fiber reinforced inner container. Since the container is secured against lifting, it would bulge under the mentioned buoyant forces. To prevent such a deformation, 3000 liters of water are initially introduced into the glass fiber reinforced inner container. This results in a weight component of 3.00 metric tons. Then, 450 liters of concrete are poured in (FIG. 4). This corresponds to a height of approximately 30 cm. The buoyant force of this amount of concrete is about 3.80 metric tons. This results in a total upwardly acting force of 0.86 metric tons. The introduced concrete occupies a volume of about 1.93 m$^3$. With the mentioned density of 2.0 kg/dm$^3$, this results in the mentioned buoyant force of 3.86 metric tons. The initially introduced amount of concrete is vibrated, through the concrete form itself. Now, the glass fiber reinforced inner container is filled completely, until the water escapes through the two pipes (not shown) which project approximately 200 mm above the upper edge of the cover (FIG. 5). Then, the rest of the concrete amount is poured into the concrete form (FIG. 6). Under these circumstances, the weight of the water is about 7.50 metric tons, and the buoyant force reaches a magnitude of about 15.00 metric tons. The weight of the concrete above the equatorial plane may be estimated at 1.20 metric tons. Consequently, there remains an upwardly directed residual force of 6.30 metric tons. This force can be absorbed by the entire system without damages. A bulging of the glass fiber reinforced inner container is not possible, since this is prevented by the incompressible water. As soon as the lastly introduced concrete amount has reached a satisfactor strength, the spacers are withdrawn again, the concrete form 7 is opened, and the finished tank is pulled out from the lower part of the concrete form by eyes or other elements concreted therein. Subsequently, the usual finishing work, installation, and testing is accomplished. For the finish, the concrete may be provided with a protective coating.

Figure 8:
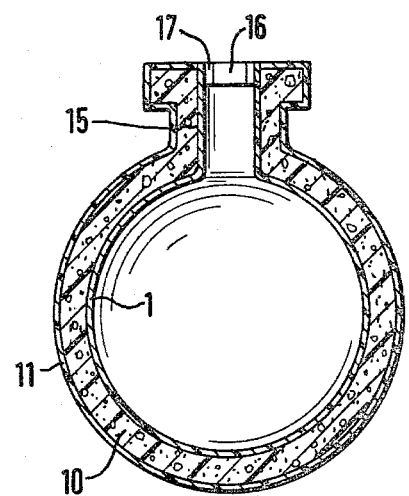
FIG. 8 is a vertical cross-sectional view of a third variant of a tank, also in diagrammatic representation.

Instead of conventional concrete, so-called polyester concrete 10 (FIG. 8) may also be used for jacketing glass fiber reinforced inner container 1. For this purpose, again the concrete form 7 shown in FIGS. 2 to 6 may be used. Since prior to its setting, the polyester concrete, consisting of a resin-bonded gravel mixture, behaves like a solid material, wherefore no buoyant forces act on the glass fiber reinforced inner container, the tank of FIG. 8 can be manufactured without filling water and without introducing the resin-bonded gravel mixture into the concrete form in two operational steps. If such a tank is used in conditions requiring protection against water, the polyester-concrete jacket may in addition be provided with a glass fiber reinforced outer shell 11. This shell is applied in a manner similar to that of producing the glass fiber reinforced inner container. In such a case, of course, there is no need for using an inflatable core, since the shape is already given. For applying the glass fiber reinforced outer shell, the glass fiber reinforced inner container jacketed with polyester concrete is, preferably, suspended and rotated about a vertical axis. A guide rail 4 and spray gun 5 according to FIG. 1 may be used in this operation, only with the guide rail 4 extending in a vertical plane.

Figure 7:
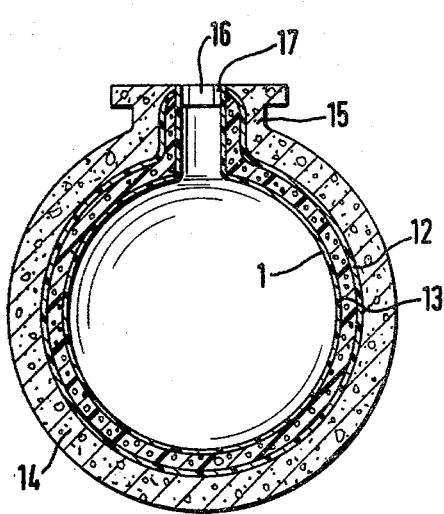
FIG. 7 is a vertical cross-sectional view of a second embodiment of a tank in diagrammatic representation.

In the embodiment of the inventive tank shown in FIG. 7, a second glass fiber reinforced container 12 is superimposed on the glass fiber reinforced inner container in the manner described in the foregoing. In this instance, however, the two containers 1 and 12 are separated from each other not by a polyester concrete layer, but by an intermediate layer 13 permeable to air. This layer consists of a polypropylene mat, the thickness of which is strongly exaggerated in FIG. 7, for clarity. The actual thickness amounts to some millimeters, for example, about 8 to 10 mm. In contrast thereto, with tanks of the here provided size, a polyester concrete jacket would be about 4 to 6 cm thick. In the intermediate layer permeable to air, which serves the purpose of vacuum monitoring, the usual exhaust and measuring lines may be embedded. Then, in a very advantageous manner, the intermediate layer 13 permeable to air is surrounded by a liquid-proof layer intended to prevent the concrete to be applied from penetrating into layer 13. Thereupon, the double-walled glass fiber reinforced inner tank formed in this manner is surrounded, in accordance with the method illustrated in FIGS. 2 to 6, with a concrete jacket 14 of conventional concrete.

The manhole necks 15 are indicated only diagrammatically, and they may be designed differently. This also applies particularly to the shape of the individual layers in the zone of the manhole 16. The shape and fitting of manhole neck 17 is also intended only as a diagrammatical example.

I claim:

1. The method of forming a substantially spherical tank using a closed mold of separable mold parts, said method comprising the steps of: inflating a spherical balloon; applying a coating of glass reinforced fiber material over the surface of said balloon; letting said glass rinforced fiber material harden to form a rigid inner container of limited strength, and removing it from said inner container; attaching a manhole cover to said inner container to render the inner container watertight; suspending said inner container from said cover; assembling a plurality of mold parts around said rigid inner container; the assembled mold being spaced from said rigid inner container; partially filling said inner container with water up to a predetermined level; adding fluid concrete into the space between said inner container and said mold at least substantially sufficient to provide buoyancy to overcome the weight of said inner container and said water area; the buoyancy counteracted by the rigidity of said inner container and said cover; then substantially filling said inner container completely with water; filling the remainder of the space between said inner container and said mold with concrete; allowing said concrete to set; and disassembling said mold to remove the resultant concrete jacketed inner container therefrom.

2. The method according to claim 1 comprising the additional step of spreading grit on the outer surface of said glass fiber reinforced inner container prior to assembling said form therearound.

3. The method according to claim 1 comprising the additional step of spraying glass fiber reinforced material over the outer surface of said concrete jacket to form, with said glass fiber reinforced inner container, a substantially vacuum tight enclosure integrally attached to the inner and outer surfaces of said concrete jacket.

4. The method according to claim 1 in which said glass fiber reinforced inner container is spaced from said mold by spacers that extend inwardly from said mold toward said container, said method comprising the additional steps of: removing said spacers prior to disassembling said mold; and substantially filling the voids in the concrete jacket left by the removal of said spacers.

5. The method according to claim 1 comprising the additional step of vibrating said mold while said concrete is hardening.

* * * * *